(No Model.)
J. C. McLACHLAN.
DRIVING MECHANISM FOR HARVESTER BINDERS.
No. 438,421. Patented Oct. 14, 1890.
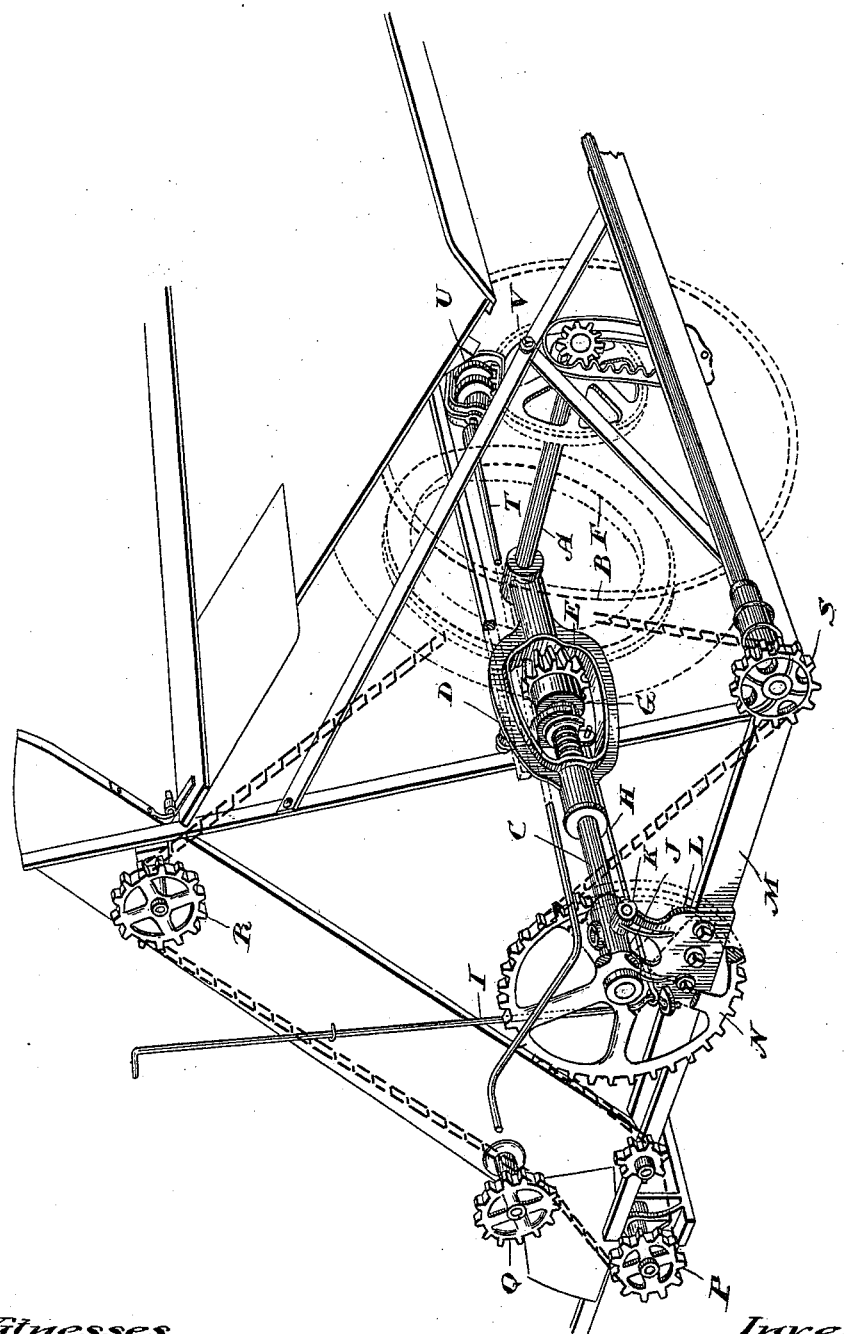
Witnesses
J. Edw. Maybee
F. R. Cameron
Inventor
J. C. McLachlan
by Donald C. Ridout
Atty

UNITED STATES PATENT OFFICE.

JOHN C. McLACHLAN, OF TORONTO, CANADA, ASSIGNOR TO THE MASSEY MANUFACTURING COMPANY, LIMITED, OF SAME PLACE.

DRIVING MECHANISM FOR HARVESTER-BINDERS.

SPECIFICATION forming part of Letters Patent No. 438,421, dated October 14, 1890.

Application filed March 13, 1890. Serial No. 343,763. (No model.)

*To all whom it may concern:*

Be it known that I, JOHN CAMPBELL MCLACHLAN, inventor, of the city of Toronto, in the county of York, in the Province of Ontario, Canada, have invented a certain new and useful Improvement in the Driving Mechanism for Harvester-Binders, of which the following is a specification.

The object of the invention is to simplify the arrangement of gearing through which motion is conveyed from the main ground-wheel of the machine to the operating mechanism of the harvester, the said gearing being designed to permit a free vertical adjustment of the machine without in any way straining or interfering with the satisfactory operation of the said gearing; and it consists, essentially, of an intermediate driving-shaft supported in a suitable bearing, one end of which is journaled on the axle of the main ground-wheel and the other end pivoted on the frame of the machine, the said intermediate shaft having fixed to it a beveled pinion designed to mesh with a gear-wheel fixed to the main ground-wheel. In order that the revolving movement of the said ground-wheel shall be transmitted to the intermediate shaft, on which a sprocket-wheel is fixed, a suitable chain-gearing is placed on the said sprocket-wheel and conveyed around the other sprocket-wheel, connected, respectively, to the various shafts from which the operating parts of the machine derive their motion.

The figure is a perspective view of the mechanism involved in my invention.

In the drawing, A is a shaft of the ground-wheel B, which is shown in dotted lines.

C is the intermediate shaft, supported at one end by a yoke-shaped bearing-box D, which is journaled on the shaft A, as indicated. Within the yoke of the bearing-box D, I loosely mount on the shaft C a bevel-pinion E, which meshes with the gear-wheel F, fixed to the ground-wheel B, and which, like the ground-wheel, I show merely in dotted lines.

D is a clutch keyed to the shaft C in such a manner that it will not revolve thereon, but may be longitudinally adjusted, in order that the connection between the beveled pinion E and the shaft C may be made at any desired time. This clutch G is operated by a rod H and a crank-rod I, located as indicated.

J is a bearing-box, preferably connected to the bearing-box D and designed to support the outer end of the shaft C. This bearing-box J is provided with trunnions K, which are pivoted in bearings formed in a bracket L, fixed to the frame M of the machine.

N is a sprocket-wheel fixed to the outer end of the shaft C.

O is a sprocket-chain carried over the sprocket-wheel N, thence around the sprocket-wheel P, which is connected to the shaft driving the grain-table canvas, thence around the sprocket-wheels Q and R, connected to the shafts driving the elevating-canvases, and, after passing around a sprocket-wheel (not shown in the drawing, but which is connected to the shaft from which the knotting mechanism derives motion) is carried around the sprocket-wheel S, back over the sprocket-wheel N, the sprocket-wheel S being connected to the shaft from which the knives of the machine derive their reciprocating motion.

I may mention here that my improved system of driving-gear is applied, as shown and described, to that class of harvesters in which the machine is vertically adjustable upon the shaft of its ground-wheel.

It will be seen that if the intermediate shaft C were supported in bearing-boxes rigidly held in position it would be impossible to effect the vertical adjustment of the machine; but by pivotally supporting the said shaft in boxes journaled on the axle of the ground-wheel and pivoted to a bracket of the frame of the machine the machine may be vertically adjusted, as required, without straining or in any way interfering with the satisfactory operation of the driving mechanism described.

It is quite true that the sprocket-wheel N may be slightly tilted; but this tilt does not interfere with the operation of the sprocket-chain O.

Although the mechanism for imparting the vertical adjustment to the frame of the machine is old and forms no part of my invention, I may mention that the crank-shaft T, worm U, and worm-wheel V are provided for the purpose of revolving the shaft A, which motion imparts the necessary vertical adjustment of the machine, as will be understood by any one familiar with harvesters.

What I claim as my invention is—

1. In a harvester, an intermediate shaft supported at one end in a bearing-box mounted on the ground-wheel axle and at its other end in a bearing pivoted on the frame of the machine, gearing being provided to connect the intermediate shaft with the ground-wheel, substantially as and for the purpose specified.

2. In a harvester, an intermediate shaft supported at one end in a bearing-box mounted on the ground-wheel axle and at its other end in a bearing pivoted on the frame of the machine, gearing being provided to connect the intermediate shaft with the ground-wheel, in combination with a sprocket-wheel fixed to the intermediate shaft and connected by a sprocket-chain to sprocket-wheels on the shafts, from which the different operating parts of the machine derive their motion, substantially as and for the purpose specified.

Toronto, November 12, 1889.

JOHN C. McLACHLAN.

In presence of—
CHARLES C. BALDWIN,
E. CUMMINGS.